United States Patent [19]

Sohmuta

[11] Patent Number: 5,493,550
[45] Date of Patent: Feb. 20, 1996

[54] VELOCITY DETECTION CIRCUIT

[75] Inventor: Mitoshi Sohmuta, Tokyo, Japan

[73] Assignee: NEC Corporation, Tokyo, Japan

[21] Appl. No.: 348,062

[22] Filed: Nov. 23, 1994

[30] Foreign Application Priority Data

Dec. 16, 1993 [JP] Japan .................. 5-316151

[51] Int. Cl.⁶ ..................................... G11B 7/00
[52] U.S. Cl. ............... 369/54; 369/44.28; 369/44.34
[58] Field of Search ................... 369/44.28, 44.29, 369/44.34, 32, 33, 43, 54; 360/78.05, 78.06, 78.08, 78.11, 51

[56] References Cited

U.S. PATENT DOCUMENTS

| | | | |
|---|---|---|---|
| 5,157,645 | 10/1992 | Takahara et al. ..................... | 369/44.28 |
| 5,216,651 | 6/1993 | Hwang .................... | 369/44.28 |
| 5,327,410 | 7/1994 | Gleim et al. ..................... | 369/44.28 |
| 5,428,591 | 6/1995 | Lee ................... | 369/44.28 X |
| 5,457,671 | 10/1995 | Takata et al. ...................... | 369/44.28 |

*Primary Examiner*—Aristotelis Psitos
*Assistant Examiner*—Thang V. Tran
*Attorney, Agent, or Firm*—Young & Thompson

[57] ABSTRACT

A velocity detection circuit which detects the velocity of movement of an optical head. The velocity detection circuit includes an edge detection circuit for detecting an edge of a position detection signal and outputting an edge signal, a divider for dividing a clock signal of a predetermined period, a first binary counter and a first D-type flipflop for counting the number of pulses of the divided clock signal within an interval from an edge signal to a next edge signal to calculate time data, a second binary counter for counting the clock signal, a comparator for outputting, when the time data outputted from the first D-type flipflop and the data counted by the second binary counter coincide with each other, a pulse (reference signal) to be used to reset the count data of the second binary counter, and a third binary counter and a second D-type flipflop for counting the number of pulses of the comparison signal based on a sampling signal generated at fixed time intervals to calculate velocity data.

6 Claims, 7 Drawing Sheets

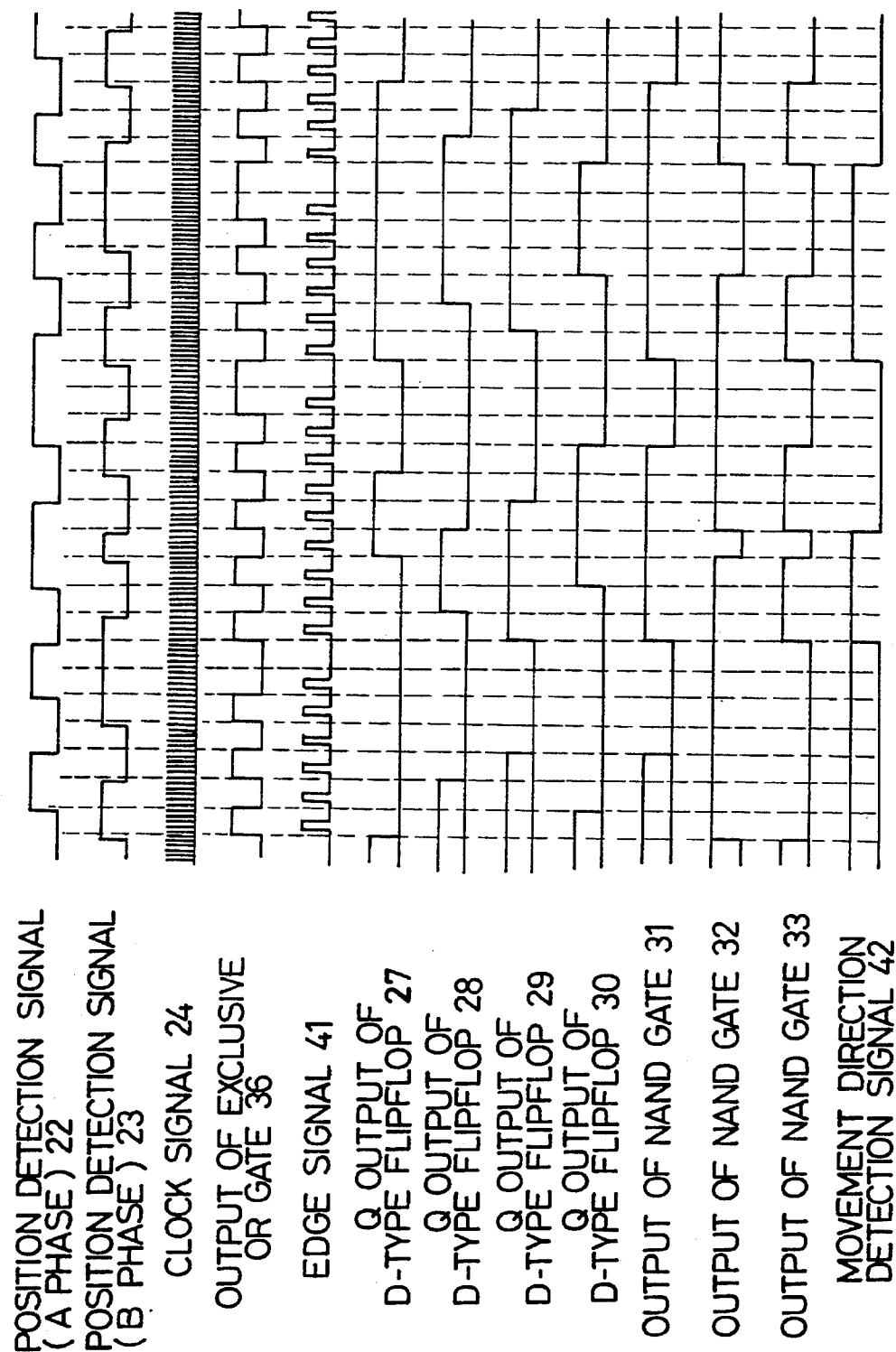

VELOCITY DETECTION CIRCUIT

BACKGROUND OF THE INVENTION (1) Field of the Invention

This invention relates to improvements in the techniques for detection of the velocity of movement of an optical head or the velocity of rotation of a spindle motor in an optical disk apparatus or a like apparatus.

(2) Description of the Prior Art

As optical disk apparatus, there are CD players (CD-ROM drives) and video disk players as well as optomagnetic files. In those optical disk apparatus which are positioned as peripheral equipments to computers, high speed data retrieval is required. To this end, conventionally the velocity of movement of an optical head is detected to effect velocity control of the optical head to realize a high speed moving operation of the optical head thereby.

In the velocity control, the number of tracking error signals produced for each unit time is counted to calculate velocity data. The calculation method is described below with reference to FIGS. 1 and 2.

FIG. 1 is a block diagram showing an example of construction of a conventional velocity detection apparatus, and FIG. 2 is a timing chart illustrating operation of the velocity detection apparatus.

Referring to FIG. 1, a signal wherein a pulse is produced each time an optical head moves a fixed distance as seen in FIG. 2, for example, a tracking error signal, is used as position detection signal 43 to be inputted to binary counter 44. This position detection signal 43 presents the form of a pulse of a short period when the velocity of movement of the optical head is high, but presents the form of a pulse of a long period when the velocity of movement of the optical head is low. Accordingly, the difference in density of pulses of position detection signal 32 corresponds to the velocity of the optical head.

In the velocity detection apparatus shown in FIG. 1, binary counter 44 is reset by sampling signal 46 of a fixed period and counts the number of pulses of position detection signal 43 for each fixed period. D-type flipflop 47 latches data counted by binary counter 44 at the rising edge of each pulse of sampling signal 46 to produce velocity data 47.

The conventional velocity detection apparatus described above, however, has the following problems.

In particular, in the conventional velocity detection apparatus, when the velocity of movement of the optical head is high, good velocity data are obtained since the number of counted pulses is great. However, as the velocity decreases, the accuracy in detection of velocity data decreases since the period of position detection signal 43 approaches the period of sampling signal 46. On the other hand, if the period of the sampling signal increases, the number of pulses of position detection signal 43 per one sample increases to enhance the detection capacity of velocity data. However, since the sampling period becomes long, the capacity of controlling the velocity of movement is degraded.

SUMMARY OF THE INVENTION

It is an object of the present invention to provide a velocity detection apparatus which solves the problems described above and can detect, even when the velocity of movement of an optical head is low, the velocity of the optical head with a high degree of accuracy without using a long sampling period.

It is another object of the present invention to provide a velocity detection circuit which can detect the velocity of an optical head with a high degree of accuracy even when the sampling period is short.

In order to attain the objects described above, in the present invention, there is provided a velocity detection circuit for an optical head which moves along an optical disk in a radial direction of the optical disk, comprising a divider for dividing a clock signal of a predetermined period, an edge detection circuit for detecting, based on a signal obtained by the division of the divider, both or one of a rising edge and a falling edge of a position detection signal corresponding to the movement of the optical head to produce an edge signal, first counting means for counting, based on the edge signal produced by the edge detection circuit, the number of pulses of the signal obtained by the division of the divider within an interval from a first edge to a succeeding second edge of the position detection signal, first calculation means for calculating, based on the edge signal produced by the edge detection circuit, time data from the data obtained by the counting of the first counting means, second counting means for counting the number of pulses of the clock signal of the predetermined period, comparison means for comparing the time data calculated by the first calculation means and the count value counted by the second counting means with each other, clearing the count value of the second counting means when coincidence between the time data and the count value compared with each other is detected, and repeating the clearing operation for the count value of the second counting means until the first calculation means calculates time data in a next operation cycle to produce a clock signal having a period corresponding to the time data, third counting means for counting, based on a sampling signal generated at fixed time intervals, the number of pulses of the clock signal produced by the comparison means and having a period corresponding to the time data, and second calculation means for calculating, based on the sampling signal generated at the fixed time intervals, velocity data from data obtained by the counting of the third counting means.

In order to attain the objects described above, in the present invention, there is also provided a velocity detection circuit for an optical head which moves along an optical disk in a radial direction of the optical disk, comprising, an edge detection circuit for detecting, based on a clock signal of a predetermined period, both or one of a rising edge and a falling edge of a position detection signal corresponding to the movement of the optical head to produce an edge signal, counting means for counting, based on the edge signal produced by the edge detection circuit, the number of pulses of the clock signal of the predetermined period within an interval from a first edge to a succeeding second edge of the position detection signal, calculation means for calculating, based on the edge signal produced by the edge detection circuit, time data from the data obtained by the counting of the counting means, and a read-only memory having a predetermined address corresponding to the time data calculated by the calculation means and having, stored in the predetermined address data thereof, obtained by multiplying a reciprocal number to the time data by an arbitrary coefficient for producing velocity data from the time data.

As a preferred form of each of the velocity detection circuits, the position detection signal is a tracking error signal which is generated when the optical head moves across tracks recorded on the optical disk.

As another preferred form, the position detection signal is a pulse signal which is generated at equal rotational angles upon rotation of a spindle motor provided for the optical head.

As a further preferred form, the position detection signal is a pulse signal which is generated at predetermined intervals with respect to the amount of movement of the optical head.

As a still further preferred form, the position detection signal includes a pair of signals of a tracking error signal and a land groove signal having different phases from each other, and further comprising means for detecting the direction of movement of the optical head from the position detection signal and providing a positive or negative polarity to the velocity data.

In this instance, the position detection signal includes a pair of signals of a tracking error signal and a mirror signal having different phases from each other.

With the construction described above, the drawback of conventional systems, in which the number of pulses of a position detection signal per unit time is counted, is eliminated by making the detection capacity low when the unit time is short and conversely making the control capacity low when the unit time is long.

With the velocity detection circuits of the present invention, since the velocity of movement of the optical head can be detected with a high degree of accuracy without making the unit time long, there is an advantage in that enhancement of the control capacity can be achieved.

Further, with the velocity detection circuits of the present invention, since the velocity of movement of the optical head can be detected even if the unit time is made short, further enhancement of the control capacity can be achieved.

BRIEF DESCRIPTION OF THE DRAWINGS

In the accompanying drawings:

FIG. 8 is a timing chart illustrating operation of the velocity detection circuit shown in FIG. 7.

DESCRIPTION OF THE PREFERRED EMBODIMENTS

The velocity detection system of the present invention is described below with reference to the drawings.

Figure 1:
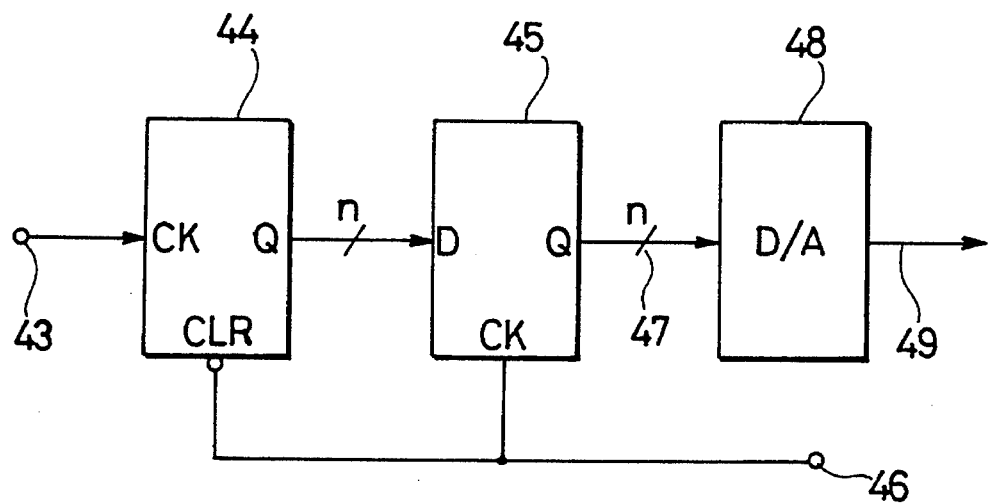
FIG. 1 is a block diagram showing a general construction of a conventional velocity detection circuit.
Figure 2:
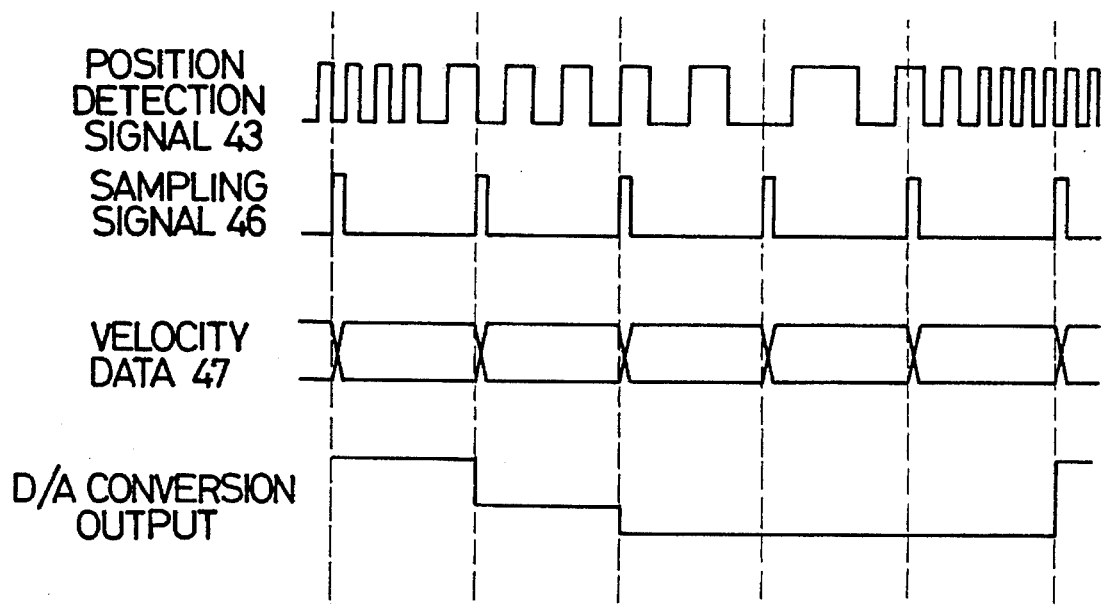
FIG. 2 is a timing chart illustrating operation of the conventional velocity detection circuit shown in FIG. 1.
Figure 3:
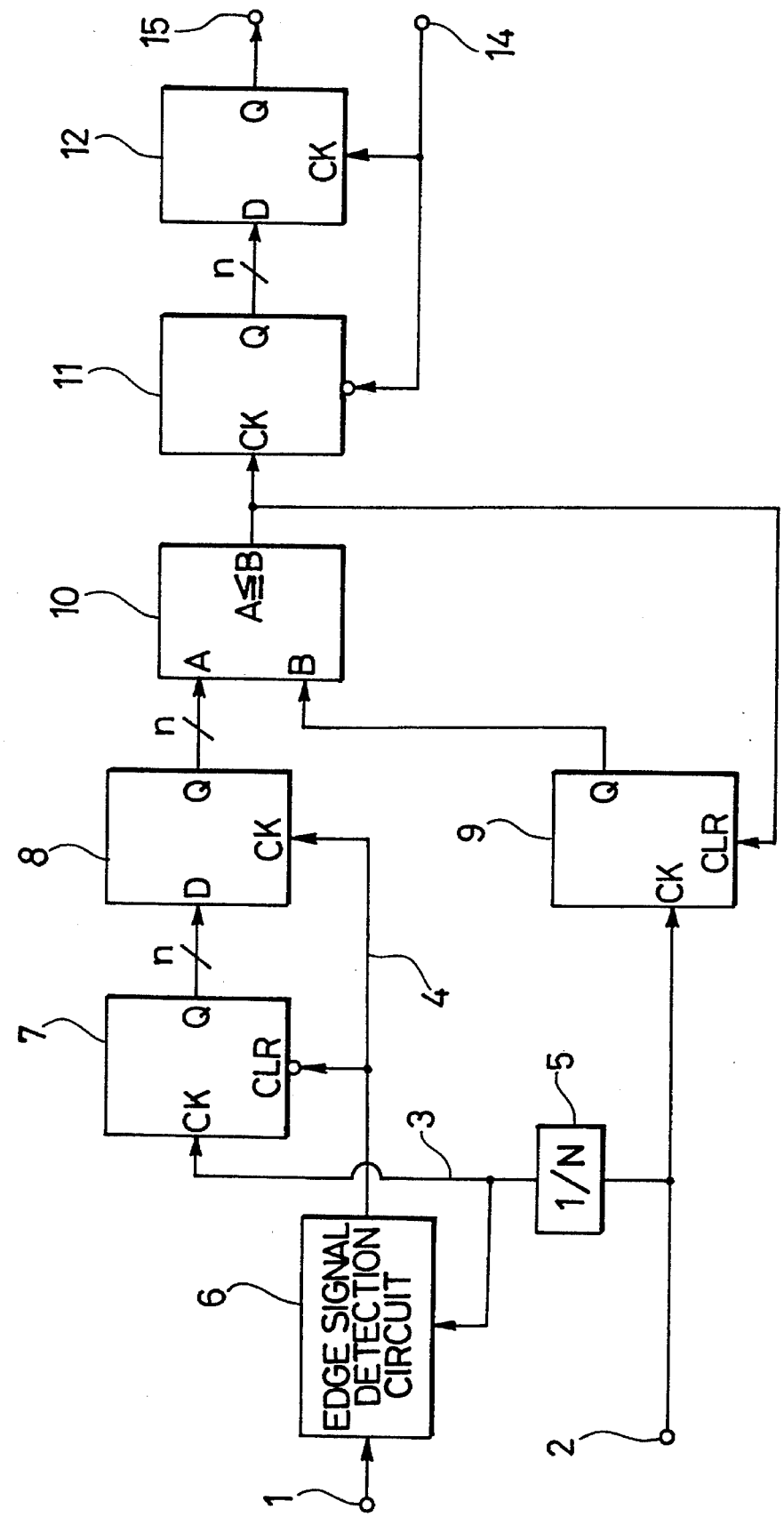
FIG. 3 is a block diagram showing a general construction of a velocity detection circuit of a first embodiment of the present invention.
Figure 4:
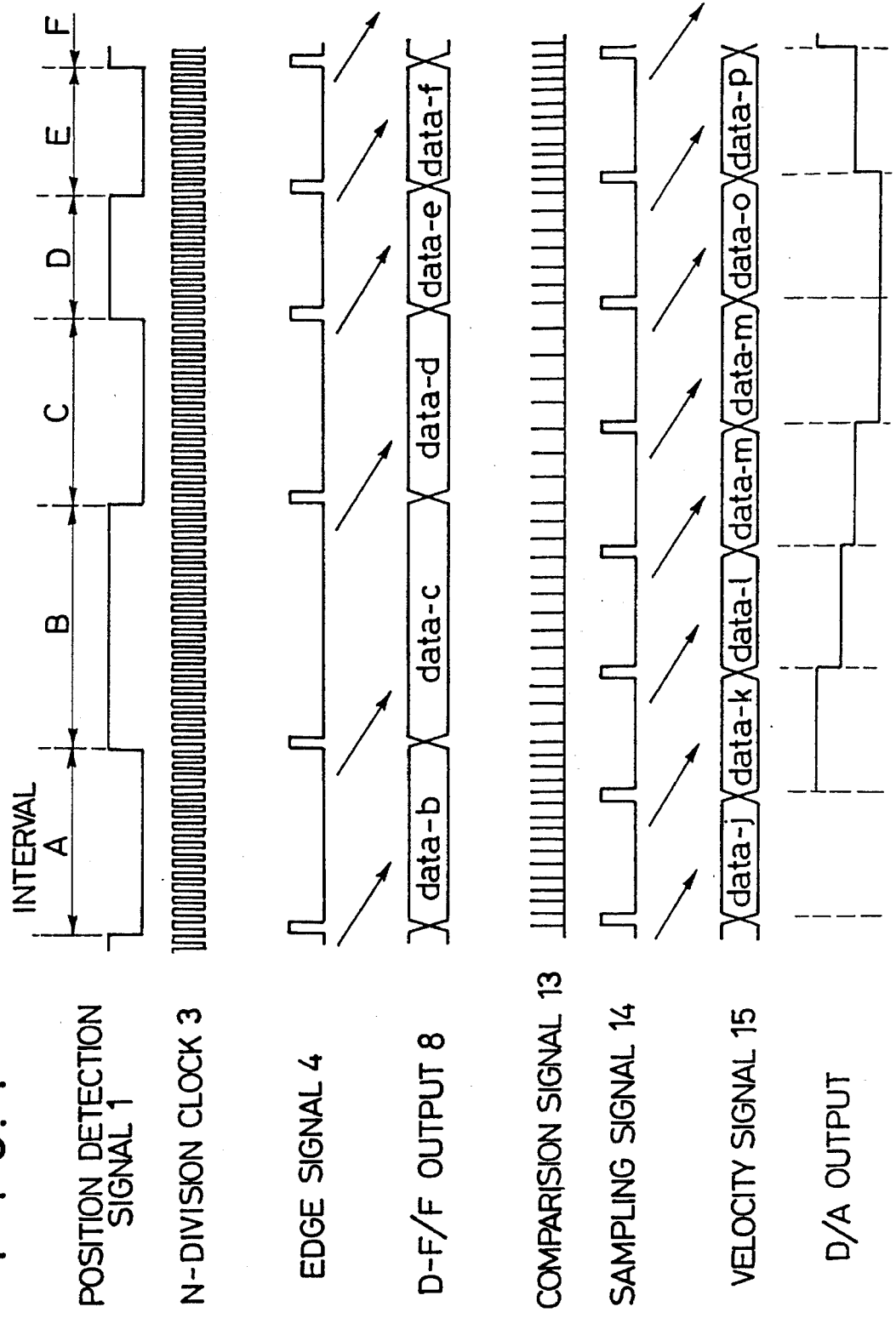
FIG. 4 is a timing chart illustrating operation of the velocity detection circuit shown in FIG. 3.

FIG. 3 is a block diagram showing a general construction of a velocity detection circuit of a first embodiment of the present invention, and FIG. 4 is a timing chart illustrating operation of the velocity detection circuit shown in FIG. 3.

The velocity detection circuit of the present embodiment includes divider 5, edge signal detection circuit 6, binary counters 7, 9 and 11, D-type flipflops 8 and 12, and comparator (magnitude comparator) 10.

In the velocity detection circuit, divider 5 receives clock signal 2 of a predetermined period as an input thereto and outputs N-division clock signal 3. Edge signal detection circuit 6 receives the output (N-division clock signal 3) of divider 5 and position detection signal 1 as inputs thereto and outputs edge signal 4. Binary counter 7 has input terminal CLR to which the output line of edge signal detection circuit 6 is connected, and has another input terminal CK to which the output line of divider 5 is connected. Binary counter 7 counts the number of pulses of N-division clock signal 3 from edge signal 4.

D-type flipflop 8 has input terminal D to which the output line of output terminal Q of binary counter 7 is connected, and has another input terminal CK to which the output line of edge signal detection circuit 6 is connected. D-type flipflop 8 latches the count value of binary counter 7 in response to edge signal 4. Binary counter 9 has input terminal CK to which clock signal 2 is inputted, and has another input terminal CLR to which the output line of comparator 10 is connected. Binary counter 9 cumulatively counts the number of pulses of clock signal 2 until the count value thereof coincides with data latched by D-type flipflop 8. Comparator 10 has input terminal A to which the output line of output terminal Q of D-type flipflop 8 is connected, and has another input terminal B to which the output-line of output terminal Q of binary counter 9 is connected. Comparator 10 compares data inputted to terminals A and B with each other and outputs comparison signal L when A>B, but outputs another comparison signal H when A=B.

Binary counter 11 has input terminal CK to which the output line of comparator 10 is connected, and has another input terminal CLR to which sampling signal 14 is inputted. Binary counter 11 counts the number of pulses of the output signal of comparator 10 with reference to sampling signal 14. D-type flipflop 12 has input terminal D to which the output line of output terminal Q of binary counter 11 is inputted, and has another input terminal CK to which sampling signal 14 is inputted. D-type flipflop 12 latches the count value of binary counter 11 in response to sampling signal 14 to produce velocity data 15.

In the velocity detection circuit constructed as described above, velocity data 15 is produced from position detection signal 1. The production of velocity data 15 is described below with reference to FIG. 4.

When position detection signal 1 is inputted to edge signal detection circuit 6, inputted position detection signal 1 is converted, based on N-division clock signal 3 outputted from divider 5, into edge signal 4 which presents a pulse at each variation point of position detection signal 4 as shown in FIG. 4. Edge signal 4 obtained by the conversion is inputted to input terminal CLR of binary counter 7 and input terminal CK of D-type flipflop 8.

In binary counter 7, the count of the number of pulses of N-division clock signal 3 is cleared in response to edge signal 4. Consequently, binary counter 7 counts the number of pulses of N-division clock signal 3 within the time after the count number is cleared in response to edge signal 4 in an operation cycle until the count number is cleared in response to edge signal 4 in the next operation cycle, for example, within interval A of position detection signal 1 shown in FIG. 4. The count value is inputted to input terminal D of D-type flipflop 8.

When the count number of binary counter 7 within interval A of position detection signal 1 is sent out to D-type flipflop 8, D-type flipflop 8 latches the count value of binary counter 7 at the rising edge of a pulse of edge signal 4 at the end point of interval A. The thus latched data is sent out to input terminal A of comparator 10. The data thus sent out from D-type flipflop 8 is data (hereinafter referred to as time data) which increases in proportion to time since it is represented in the number of pulses of N-divided clock signal 3 produced at equal time intervals from an edge (variation point) to a next edge of position detection signal 1.

Meanwhile, binary counter 9 receives clock signal 2 as an input thereto and counts the number of pulses of clock signal 2. The cumulative count number of binary counter 9 is sent out to the other input terminal B of comparator 10.

After the data latched by D-type flipflop 8 is inputted to input terminal A of comparator 10 and the data counted by binary counter 9 is inputted to the other input terminal B of comparator 10, the following processing is executed by comparator 10. In particular, comparator 10 compares the time data within interval A of edge signal 4 inputted to input terminal A thereof and the cumulative count data inputted to input terminal B thereof with each other, and outputs an L signal as an output signal (comparison signal 13) when the time indicated by the cumulative count data is smaller than the time indicated by the time data, but outputs an H signal as comparison signal 13 when the two times coincide with each other.

Comparison signal 13 is inputted to input terminal CLR of binary counter 9, and when comparison signal 13 changes to an H signal, the count number of binary counter 9 is cleared. When binary counter 9 is cleared, the time indicated by the cumulative count data inputted to input terminal B of comparator 10 becomes smaller than the time indicated by the time data inputted to input terminal A of comparator 10, and consequently, comparison signal 13 changes from an H signal to an L signal. After comparison signal 13 changes from an H signal to an L signal, binary counter 9 starts counting of the number of pulses based on clock signal 2 again and sends out the count data thereof to input terminal B of comparator 10 again.

The processing described above is repeated so that comparison signal 13 having a period corresponding to the value of the count data within interval A of position detection signal 1 latched by D-flipflop 8 is produced based on clock signal 2 by comparator 10. In particular, pulses (hereinafter referred to as velocity pulses) having a period corresponding to the time data within interval A of position detection signal 1 are produced. Such production of comparison signal 13 is performed until after latch data are inputted in the next operation cycle from flipflop 8.

The velocity pulses (comparison signal 13) produced in such a manner as described above are inputted to input terminal CK of binary counter 11. When the velocity pulses (comparison signal 13) are inputted, binary counter 11 counts the number of the thus inputted velocity pulses with reference to sampling signal 14 having a fixed period and sends out the thus counted value to input terminal D of D-type flipflop 12.

When the count value from binary counter 11 is inputted to input terminal D of D-type flipflop 12, D-type flipflop 12 latches the output of binary counter 11 in response to sampling signal 14 and produces velocity data 15 within interval A of position detection signal 1 from the thus latched count value.

In the velocity detection circuit of the present embodiment, such processing as described above is performed for each of the intervals (interval A, B, C, D, E, F, . . . ) of position detection signal 1 to produce velocity data 15 in the intervals so that a D/A output such as seen from FIG. 4 is obtained.

Next, a second embodiment of the present invention is described with reference to FIGS. 5 and 6.

Figure 5:
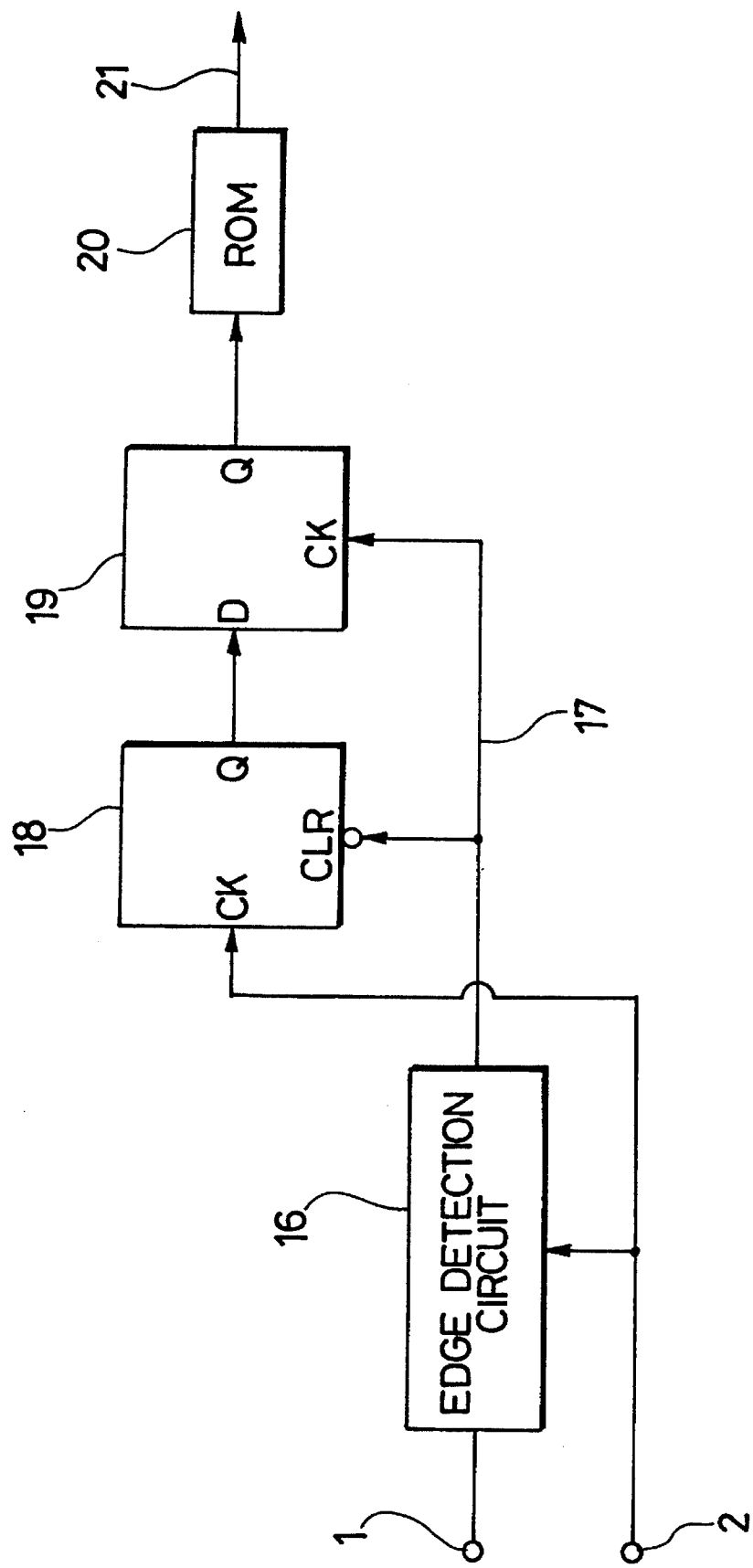
FIG. 5 is a block diagram showing a general construction of a velocity detection circuit of a second embodiment of the present invention in which a ROM is employed.
Figure 6:
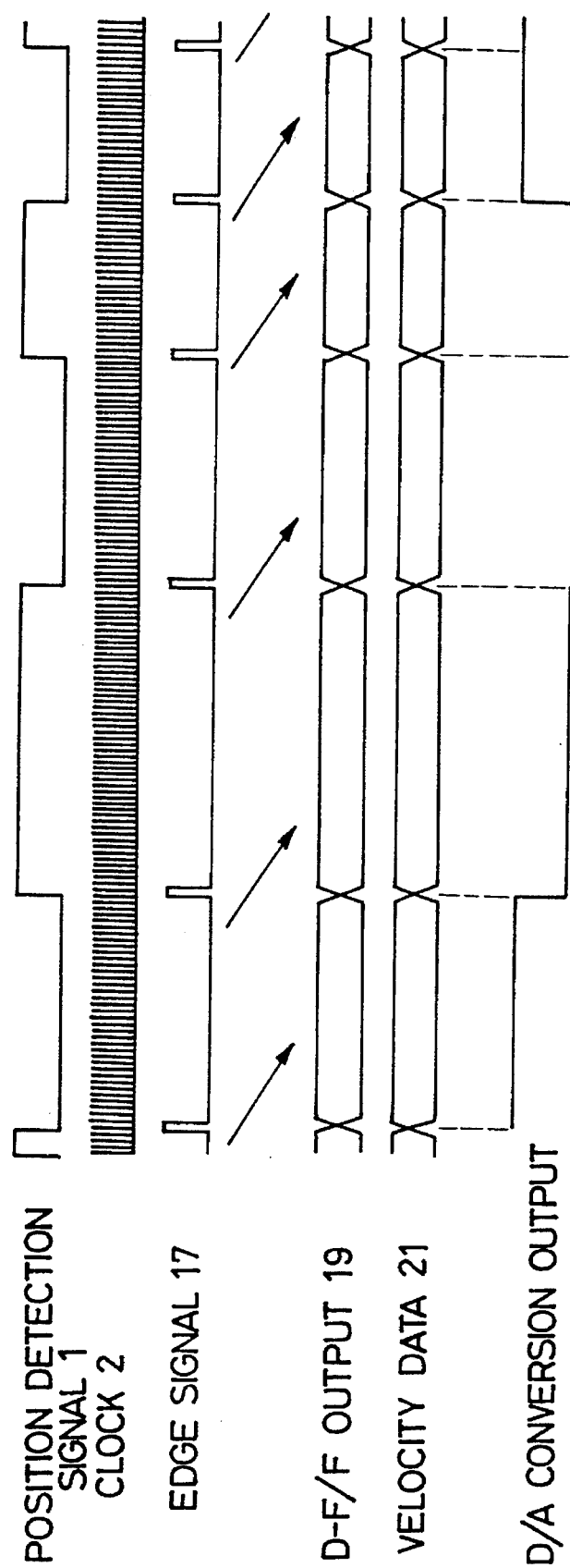
FIG. 6 is a timing chart illustrating operation of the velocity detection circuit shown in FIG. 5.

FIG. 5 is a block diagram showing a general construction of a velocity detection circuit of the second embodiment of the present invention, and FIG. 6 is a timing chart illustrating operation of the velocity detection circuit shown in FIG. 5.

The velocity detection circuit of the present embodiment includes edge detection circuit 16, binary counter 18, D-type flipflop 19, and ROM 20.

In the velocity detection circuit, edge signal detection circuit 16 inputs position detection signal 1 and clock signal 2 of a predetermined period as inputs thereto and outputs edge signal 17. Binary counter 18 has input terminal CLR to which the output line of edge signal detection circuit 16 is connected, and has another input terminal CK to which clock signal 2 is inputted. Binary counter 18 counts the number of pulses of N-division clock signal 3 with reference to edge signal 4. D-type flipflop 19 has input terminal D to which the output line of output terminal Q of binary counter 7 is connected, and has another input terminal CK to which the output line of edge signal detection circuit 16 is connected. D-type flipflop 19 latches the count value of binary counter 18 in response to edge signal 17. ROM 20 has stored at each address thereof a value obtained by multiplying a reciprocal number to its address data by α. It is to be noted that value α here is a constant which depends upon the frequency of clock signal 2.

In the velocity detection circuit of the present embodiment constructed in such a manner as described above, time data are produced from position detection signal 1 and clock signal 2 by edge detection circuit 16, binary counter 18 and D-type flipflop 19. The time data thus produced is inputted from D-type flipflop 19 to a predetermined address of ROM 20. After time data is inputted to each address of ROM 20, velocity data 21 is calculated from the thus inputted time data by ROM 20 since a value obtained by multiplying a reciprocal number to the address data by α is stored in advance in the address of ROM 20.

As described above, in the velocity detection circuit of the present embodiment, velocity data can be obtained by inputting time data calculated by edge detection circuit 16, binary counter 18 and D-type flipflop 19 to a predetermined address of ROM 20 in which a value obtained by multiplying a reciprocal number to data of the address by α is stored in advance.

Next, a velocity detection circuit of a third embodiment of the present invention is described.

While, in the velocity detection circuits of the first and second embodiments described above, only the magnitude of velocity of movement of the optical head is detected, in the velocity detection circuit of the present embodiment, detection of the direction of movement is performed in addition to the magnitude of velocity. A detailed construction is shown in FIG. 7, and detailed description of it is given below.

Figure 7:
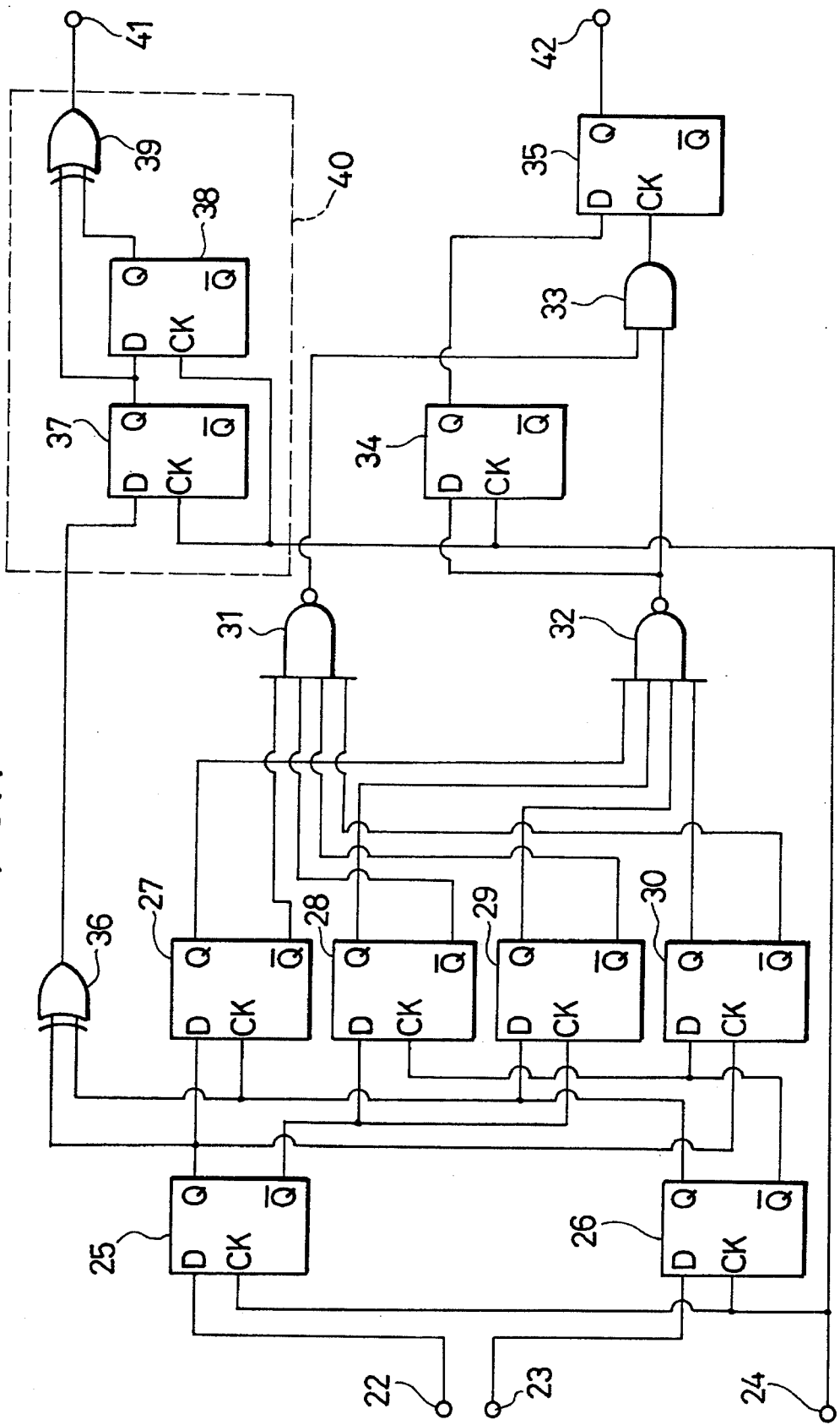
FIG. 7 is a block diagram showing a general construction of a velocity detection circuit of a third embodiment of the present invention which employs a moving direction detection circuit.

Referring to FIG. 7, the velocity detection circuit includes a first circuit for producing movement direction detection signal 42, and a second circuit for producing an edge detection signal.

The first circuit includes a pair of D-type flipflops 25 and 26 to which a tracking error signal (position detection signal 22) and a land groove signal or mirror signal (position detection signal 23) and a clock signal 24 are inputted, D-type flipflops 27 to 30 for individually receiving the non-inverted outputs and the inverted outputs of D-type flipflops 25 and 26 as inputs thereto, a pair of NAND gates 31 and 32 for receiving the outputs of D-type flipflops 27 to 30 as inputs thereto, AND gate 33 for receiving the outputs of NAND gates 31 and 32 as inputs thereto, D-type flipflop 34 for receiving clock signal 24 and the output of NAND gate 32 as inputs thereto, and D-type flipflop 35 for receiving the outputs of D-type flipflop 34 and AND gate 33 as inputs thereto and outputting movement direction detection signal 42.

Meanwhile, the second circuit includes exclusive OR gate 36 for receiving the non-inverted outputs of D-type flipflops 25 and 26 as inputs thereto, and edge detection circuit 40 for receiving the output of exclusive OR gate 36 and clock signal 24 as inputs thereto and outputting edge detection signal 41. Edge detection circuit 40 includes D-type flipflop 37 for receiving the output of exclusive OR gate 36 and clock signal 24 as inputs thereto, another D-type flipflop 38 for receiving the output of D-type flipflop 37 and clock signal 24 as inputs thereto, and exclusive OR gate 39 for receiving the outputs of D-type flipflops 37 and 38 as inputs thereto.

In the voltage detection circuit constructed in such a manner as described above, two kinds of position detection signals 22 and 23 having different phases such as a tracking error signal (position detection signal 22) and a land groove signal or mirror signal (position detection signal 23) are used as movement velocity and position detection signals to detect the velocity and the direction of movement of the optical head. In particular, in the velocity detection circuit of the present embodiment, the direction of movement of the optical head is detected by the first circuit described above while an edge signal is produced by the second circuit described above to obtain an absolute value of the direction of movement of the optical head. It is to be noted that the detection of the direction of movement of the optical head by the first circuit makes use of the fact that the phase of position detection signal 23 leads or lags by $\pi/2$ with respect to position detection signal 22 whether the optical head moves in a direction toward an outer circumference or toward an inner circumference.

FIG. 8 is a timing chart illustrating operation of the velocity detection circuit shown in FIG. 7. Operation of the velocity detection circuit described above is described below with reference to FIG. 8.

In the first circuit, the variation points of position detection signals 22 and 23 are adjusted by D-type flipflops 25 and 26 so that they vary at timings of the rising edges of clock signal 24. The non-inverted outputs and the inverted outputs of D-type flipflops 25 and 26 are inputted to D-type flipflops 27 to 30.

When the non-inverted outputs and the inverted outputs of D-type flipflops 25 and 26 are inputted to D-type flipflops 27 to 30, signals each indicating of the direction of movement of the optical head are outputted from D-type flipflops 27 to 30. Each of those signals indicates the direction of movement of the optical head.

The outputs of D-type flipflops 27 to 30 provide different timings at which the direction of movement can be detected depending upon the relationship between the outputs of position detection signals 22 and 23. Therefore, NAND gates 31 and 32, D-type flipflops 34 and 35 and AND gate 33 preferentially select the one output of D-type flipflops 27 to 30 whose variation occurs at the earliest timing among them to form movement direction detection signal 42.

In the velocity detection circuit of the present embodiment, the direction of movement of the optical head is determined in accordance with the output of movement direction detection signal 42 produced in such a manner as described above by the first circuit, that is, an H signal or an L signal.

On the other hand, in the second circuit, the outputs of D-type flipflops 25 and 26 described above are inputted to edge detection circuit 40 by way of exclusive OR gate 36. Edge detection circuit 40 produces edge signal 41 from the output signal of exclusive OR gate 36 in response to clock signal 24.

In the velocity detection circuit of the present embodiment, an absolute value of a velocity is obtained if the edge signal produced by edge detection circuit 40 is supplied, for example, to the clear terminal (CLR) of binary counter 7 and the clock terminal (CK) of D-type flipflop 8 of the velocity detection circuit shown in FIG. 3 or the clear terminal of binary counter 18 and the clock terminal of D-type flipflop 19 of the velocity detection circuit shown in FIG. 5.

In the velocity detection circuit of the third embodiment described above, since position detection signals 25 and 26 whose phases are different by $\pi/2$ from each other depending upon the direction of movement of the optical signal are used as position detection signals, a position detection capacity having a degree of accuracy twice that of the velocity detection circuits of the first and second embodiments is obtained.

It is to be noted that the D-type flipflops 25 and 26 used in the present embodiment are provided in order to adjust the variation points of position detection signals 25 and 26 to each other when adjustment in timing is required to allow connection of the velocity detection circuit to another circuit, and are not necessarily required.

While, in the velocity detection circuits of the first to third embodiments of the present invention described above, a tracking error signal is used as a position detection signal and the velocity of movement of an optical head is detected from the tracking error signal, the velocity of movement of the optical head can be detected otherwise if a pulse signal which is generated at equal intervals with respect to the amount of movement of the optical head is employed in place of the tracking signal. For example, in the case of an apparatus wherein an optical sensor or a like element is provided on an optical head and the position of the optical head with respect to a measurement medium such as a slit member provided in advance along the direction of movement of the optical head is detected by means of the optical sensor, the velocity of movement of the optical head can be detected if an output signal of the optical sensor is employed in place of the tracking error signal described above.

Further, the velocity detection circuit of the present invention can also detect the velocity of rotation of a spindle motor provided on an optical head. In particular, if an output signal of an encoder of a spindle motor is employed in place of the tracking error signal (position detection signal) described above, then the speed of rotation of the spindle motor can be detected by similar processing to that described hereinabove in connection with the embodiments described above. The velocity of rotation of the spindle motor thus detected corresponds to the velocity of movement of the optical head. Also in this instance, advantages similar to those of the velocity detection circuits of the embodiments described above can be achieved naturally.

What is claimed is:

1. A velocity detection circuit for an optical head which moves along an optical disk in a radial direction of the optical disk, comprising:

a divider for dividing a clock signal of a predetermined period;

an edge detection circuit for detecting, based on a signal obtained by the division of said divider, both or one of a rising edge and a falling edge of a position detection signal corresponding to the movement of said optical head to produce an edge signal;

first counting means for counting, based on the edge signal produced by said edge detection circuit, the number of pulses of the signal obtained by the division of said divider within an interval from a first edge to a succeeding second edge of the position detection signal;

first calculation means for calculating, based on the edge signal produced by said edge detection circuit, time data from the data obtained by the counting of said first counting means;

second counting means for counting the number of pulses of the clock signal of the predetermined period;

comparison means for comparing the time data calculated by said first calculation means and the count value counted by said second counting means with each other, clearing the count value of said second counting means when coincidence between the time data and the count value compared with each other is detected, and repeating the clearing operation for the count value of said second counting means until said first calculation means calculates time data in a next operation cycle to produce a clock signal having a period corresponding to the time data;

third counting means for counting, based on a sampling signal generated at fixed time intervals, the number of pulses of the clock signal produced by said comparison means and having a period corresponding to the time data; and second calculation means for calculating, based on the sampling signal generated at the fixed time intervals, velocity data from data obtained by the counting of said third counting means.

2. A velocity detection circuit as claimed in claim 1, wherein the position detection signal is a tracking error signal which is generated when said optical head moves across tracks recorded on the optical disk.

3. A velocity detection circuit as claimed in claim 1, wherein the position detection signal is a pulse signal which is generated at equal rotational angles upon rotation of a spindle motor provided for said optical head.

4. A velocity detection circuit as claimed in claim 1, wherein the position detection signal is a pulse signal which is generated at predetermined intervals with respect to the amount of movement of said optical head.

5. A velocity detection circuit as claimed in claim 1, wherein the position detection signal includes a pair of signals of a tracking error signal and a land groove signal having different phases from each other, and further comprising means for detecting the direction of movement of said optical head from the position detection signal and providing a positive or negative polarity to the velocity data.

6. A velocity detection circuit as claimed in claim 5, wherein the position detection signal includes a pair of signals of a tracking error signal and a mirror signal having different phases from each other.

* * * * *